(12) United States Patent
Hwang et al.

(10) Patent No.: US 11,239,455 B2
(45) Date of Patent: Feb. 1, 2022

(54) POROUS CARBON ELECTRODE MANUFACTURING METHOD

(71) Applicant: BBB INC., Seongnam-si (KR)

(72) Inventors: Hyundoo Hwang, Seongnam-si (KR); Jaekyu Choi, Seoul (KR)

(73) Assignee: BBB INC., Seongnam-si (KR)

( * ) Notice: Subject to any disclaimer, the term of this patent is extended or adjusted under 35 U.S.C. 154(b) by 0 days.

(21) Appl. No.: 16/871,222

(22) Filed: May 11, 2020

(65) Prior Publication Data

US 2020/0274141 A1   Aug. 27, 2020

Related U.S. Application Data

(63) Continuation of application No. PCT/KR2017/012802, filed on Nov. 13, 2017.

(51) Int. Cl.
| | |
|---|---|
| *H01M 4/04* | (2006.01) |
| *H01G 11/26* | (2013.01) |
| *H01G 11/34* | (2013.01) |
| *H01G 11/86* | (2013.01) |
| *H01M 4/66* | (2006.01) |
| *H01M 4/80* | (2006.01) |
| *H01M 4/02* | (2006.01) |

(52) U.S. Cl.
CPC .......... *H01M 4/0471* (2013.01); *H01G 11/26* (2013.01); *H01G 11/34* (2013.01); *H01G 11/86* (2013.01); *H01M 4/0404* (2013.01); *H01M 4/663* (2013.01); *H01M 4/80* (2013.01); *H01M 2004/021* (2013.01)

(58) Field of Classification Search
CPC ... C25B 11/035; C25B 11/12; C25B 11/0405; H01M 4/8636; H01M 4/00; H01M 4/96; H01M 4/043; H01M 4/0435; H01M 4/8605; H01M 4/047; H01G 11/34; H01G 11/86
USPC .................................................. 427/227, 228
See application file for complete search history.

(56) References Cited

U.S. PATENT DOCUMENTS

| | | | | |
|---|---|---|---|---|
| 4,017,663 | A * | 4/1977 | Breault | H01M 4/90 |
| | | | | 429/524 |
| 4,647,359 | A * | 3/1987 | Lindstrom | H01M 4/96 |
| | | | | 204/294 |
| 2006/0068107 | A1 * | 3/2006 | Madou | B81C 1/00111 |
| | | | | 427/249.1 |
| 2009/0305138 | A1 * | 12/2009 | Baca | H01G 11/34 |
| | | | | 429/231.8 |
| 2019/0123339 | A1 * | 4/2019 | Yushin | H01M 4/134 |

FOREIGN PATENT DOCUMENTS

| | | | |
|---|---|---|---|
| KR | 10-1769413 | * | 8/2017 |
| KR | 101769413 B1 | | 8/2017 |

* cited by examiner

*Primary Examiner* — Tabassom Tadayyon Eslami
(74) *Attorney, Agent, or Firm* — Studebaker & Brackett PC

(57) ABSTRACT

The present invention relates to a method of manufacturing a porous carbon electrode, the method including: applying a metal film or metal particles to one surface of a carbon electrode; heat treating the carbon electrode to which the metal film or the metal particles are applied; and forming one surface of the carbon electrode in a porous structure by making the metal film or the metal particles penetrate into one surface of the carbon electrode, and the efficiency of the carbon electrode as an electrode may be improved while increasing a surface area of a carbon structure.

8 Claims, 19 Drawing Sheets

| Element | Wt% | At% |
|---|---|---|
| CK | 67.83 | 84.16 |
| OK | 04.41 | 04.11 |
| SiK | 21.18 | 11.24 |
| AuM | 06.58 | 00.50 |

POROUS CARBON ELECTRODE MANUFACTURING METHOD

CROSS-REFERENCE TO RELATED APPLICATIONS

The present application is a continuation of International Patent Application No. PCT/KR2017/012802 filed on Nov. 13, 2017. The disclosures of the above-listed applications are hereby incorporated by reference herein in their entirety.

TECHNICAL FIELD

The present invention relates to a method of manufacturing a porous carbon electrode, and more particularly, to a method of easily manufacturing a porous carbon electrode by controlling a process condition by simplifying a manufacturing process and minimizing cost.

BACKGROUND ART

A porous electrode is a material variously used for improving electrochemical reaction efficiency in various fields, such as a chemical plant, a desalination device, a fuel cell, a secondary battery, and a natural gas reformer. In order to improve the electrochemical reaction efficiency, the porous electrode needs to have functional requirements as follows.

First, a surface area of a porous electrode per unit volume needs to be high. Second, surface energy of a porous electrode needs to be high. Carbon felt or graphite felt that is one of the generally used porous electrodes is manufactured through an acid treatment of polymer felt, a carbonization reaction in an oxygen-free environment, and the like.

The carbon felt may be manufactured by carbonizing polymer felt in an oxygen-free environment. For example, the carbon felt may be manufactured by performing a heat treatment in a heat treatment furnace that is a nitrogen atmosphere or a vacuum atmosphere. The polymer felt may be made of rayon fiber, polyacrylonitrile fiber, and the like. When the polymer felt is heat treated, all elements other than carbon are decomposed and removed, and only carbon remains to form the carbon felt.

Since the carbon felt has a smooth surface and is formed with a stable carbon layer on a surface of fiber, the carbon felt is electrochemically stable, but the carbon felt has a small specific surface area and a non-activated surface, so that the carbon felt has relatively low efficiency as an electrode.

Accordingly, there is a need for a method of improving efficiency of carbon felt as an electrode while increasing a surface area of a carbon structure.

DISCLOSURE

Technical Problem

Therefore, an object of the present invention to be solved is to provide a method of manufacturing a porous carbon electrode which is capable of improving efficiency as an electrode while increasing a surface area of a carbon structure.

Technical Solution

In order to achieve the object, the present invention provides a method of manufacturing a porous carbon electrode, the method including: applying a metal film or metal particles to one surface of a carbon electrode; heat treating the carbon electrode to which the metal film or the metal particles are applied; and forming one surface of the carbon electrode in a porous structure by making the metal film or the metal particles penetrate into one surface of the carbon electrode.

According to an exemplary embodiment of the present invention, the method may further include forming the carbon electrode by pyrolyzing an organic polymer structure.

The organic polymer structure may be a photosensitve material, and the organic polymer structure may be patternable through an optical etching process. Further, the organic polymer structure may include metal particles and impurities.

Further, the metal film or the metal particles may be patterned and applied to one surface of the carbon electrode. In this case, the metal film or the metal particle may be gold.

Further, the method may further include removing the metal film or the metal particles from the carbon electrode formed in the porous structure.

In order to achieve the object, the present provides a method of manufacturing a porous carbon electrode, the method including: applying a metal film or metal particles to one surface of an organic polymer structure; heat treating an organic polymer structure to which the metal film or the metal particles are applied; and forming the organic polymer structure in a form of a porous carbon electrode by making the metal film or the metal particles penetrate into the organic polymer structure.

Further, the present invention may provide a porous carbon electrode manufactured by the foregoing method.

Advantageous Effects

According to the present invention, it is possible to easily manufacture a porous carbon electrode by controlling a process condition by simplifying a manufacturing process and minimizing cost. Further, according to the present invention, it is possible to improve efficiency of a carbon electrode as an electrode while increasing a surface area of a carbon structure.

DETAILED DESCRIPTIONS

Figure 1A:
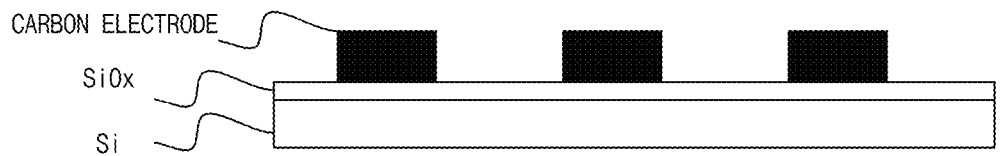
FIGS. 1A to 1E are diagrams illustrating a method of manufacturing a porous carbon electrode according to an exemplary embodiment of the present invention.

In order to achieve the object, the present invention provides a method of manufacturing a porous carbon electrode, the method including: applying a metal film or metal particles to one surface of a carbon electrode; heat treating the carbon electrode to which the metal film or the metal particles are applied; and forming one surface of the carbon electrode in a porous structure by making the metal film or the metal particles penetrate into one surface of the carbon electrode.

Hereinafter, in order to describe the present invention in more detail, exemplary embodiments of the present invention will be described in more detail with reference to the accompanying drawings. However, the present invention is not limited to the exemplary embodiment described herein, and may also be specified in another form. In the drawings, when it is said that a layer is formed "on" another layer or a substrate, the layer may be directly formed on another layer or the substrate, or may be formed on the another layer or the substrate with a third layer interposed therebetween.

It will be understood that when an element or a layer is referred to as being "on" another element or layer, it can be directly on another element or layer or an intervening layer or element may also be present. In contrast, when an element is referred to as being "directly on" another element, there are no intervening element or layer present. The spatially relative terms, "below", "beneath", "lower", "above", "upper", and the like may be used for easily describing the correlation of one element or constituent component with other element or constituent components as illustrated in the drawings. The spatially relative terms should be understood as the terms including different directions of the elements when the elements are used or operated in addition to the direction illustrated in the drawing. For example, when an element illustrated in the drawing is turned over, an element described as being "below or beneath" the other element may be placed "above" the other element. Accordingly, the illustrative term "below or beneath" may include both the directions below and above. The element may also be oriented in a different direction, and in this case, the spatially relative terms may be interpreted according to the orientation.

The present invention may have various modifications and exemplary embodiments and thus specific exemplary embodiments will be illustrated in the drawings and described. However, it is not intended to limit the present invention to the specific exemplary embodiments, and it will be appreciated that the present invention includes all modifications, equivalences, or substitutions included in the spirit and the technical scope of the present invention.

FIG. 1 is a diagram illustrating a method of manufacturing a porous carbon electrode according to an exemplary embodiment of the present invention.

Referring to FIG. 1, FIG. 1A illustrates the state where a silicon oxide (SiOx) film is formed on silicon (Si) and a carbon electrode is formed on the silicon oxide (SiOx) film.

Figure 1B:
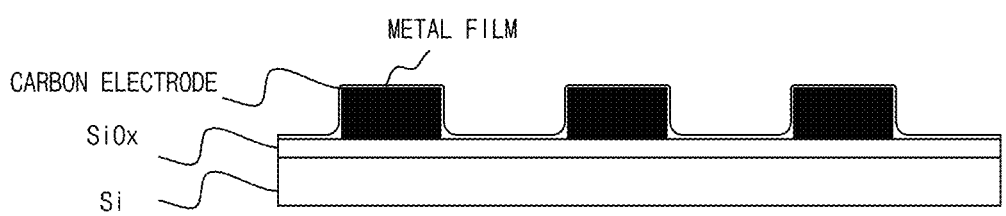
Figure 1C:
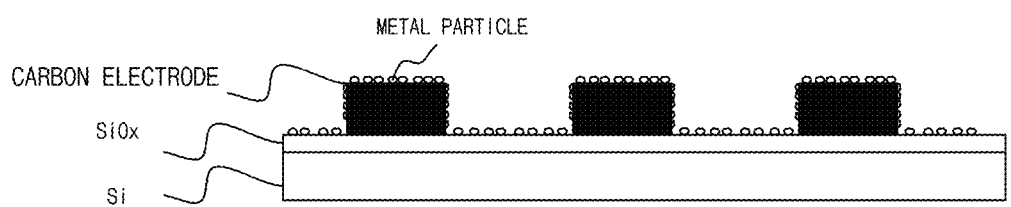

FIG. 1B illustrates the state where a metal film is applied to one surface of the carbon electrode, particularly, an upper end of the carbon electrode. As another exemplary embodiment, FIG. 1C illustrates the state where metal particles are applied to one surface of the carbon electrode, particularly, an upper end of the carbon electrode.

The metal film or the metal particles applied to the upper end of the carbon electrode may include one or more selected from the group consisting of Mg, Al, K, Ca, Sc, Ti, V, Cr, Mn, Fe, Co, Ni, Cu, Zn, Ga, Rb, Sr, Y, Zr, Mo, Ru, Rh, Pd, Ag, Cd, In, Sn, Cs, Ba, La, Ce, Nd, Sm, Eu, Gd, Tb, Hf, Ir, Pt, Tl, Pb, and Bi. Particularly, the metal may gold (Au). Otherwise, an oxide of the metal may be used.

Figure 1D:
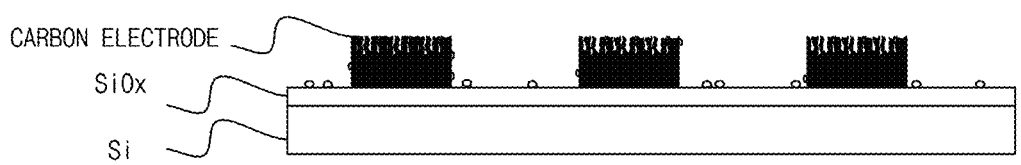

FIG. 1D illustrates the case where when the carbon electrode, to which the metal film or the metal particles are applied, is heat treated, the metal film or the metal particles are melted and penetrate into one surface, particularly, an upper end, of the carbon electrode, to generate a porous carbon electrode. In this case, a part of the carbon electrode, particularly, a surface portion of the upper end, of the carbon electrode, has a porous structure.

Figure 1E:
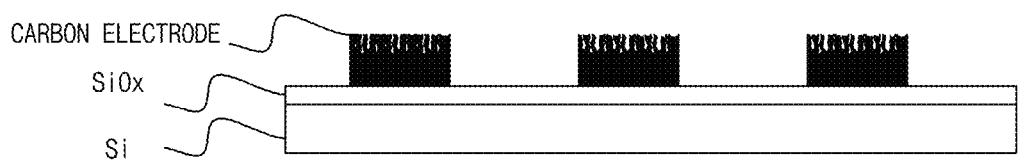

FIG. 1E illustrates the state where the metal film or the metal particles left on the carbon electrode are removed. It is preferable to use a carbon electrode formed of pure carbon by removing the metal film or the metal particles penetrating into the carbon electrode by using a gold etchant, after the heat treatment in FIG. 1D.

FIG. 2 is a diagram illustrating a method of manufacturing a porous carbon electrode according to another exemplary embodiment of the present invention.

Figure 2A:
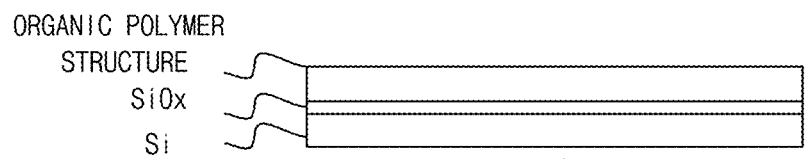
FIGS. 2A to 2H are diagrams illustrating a method of manufacturing a porous carbon electrode according to another exemplary embodiment of the present invention.

Referring to FIG. 2, FIG. 2A illustrates the state where a silicon oxide (SiOx) film is formed on silicon (Si) and an organic polymer structure is formed on the silicon oxide (SiOx) film. In this case, the organic polymer structure may be a photosensitive material. Further, the organic polymer structure may include metal particles or impurities, not the pure organic polymer structure.

Figure 2B:
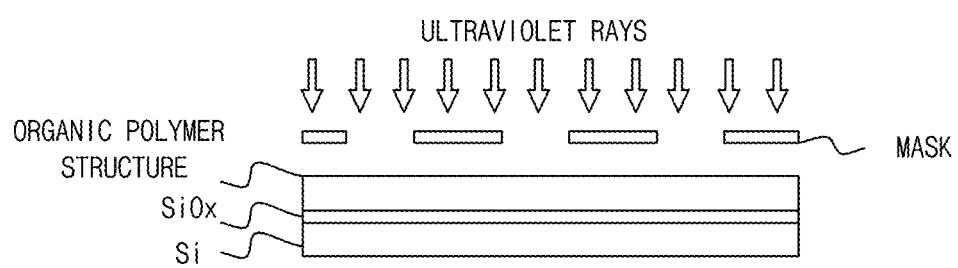

FIG. 2B illustrates the state where the organic polymer structure is etched through an optical etching process. That is, when a mask is put on the organic polymer structure and is irradiated with light, the organic polymer structure is etched according to a pattern of the mask. In this case, the irradiated light may be ultraviolet ray.

Figure 2C:
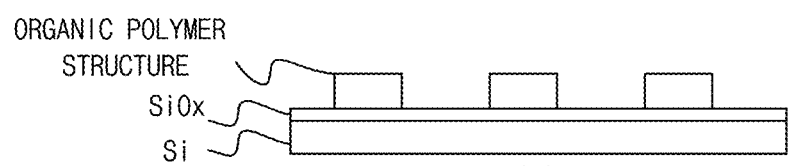

FIG. 2C illustrates the organic polymer structure in which the optical etching process is completed according to the pattern of the mask.

Figure 2D:
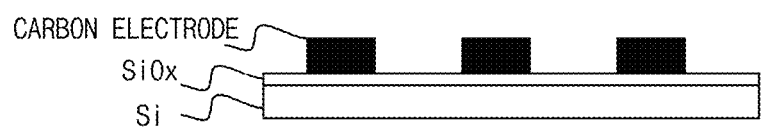

FIG. 2D illustrates the state where a carbon electrode is generated by pyrolyzing the organic polymer structure.

Figure 2E:
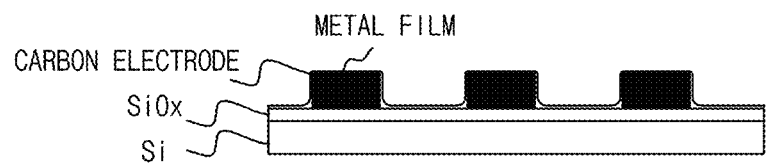
Figure 2F:
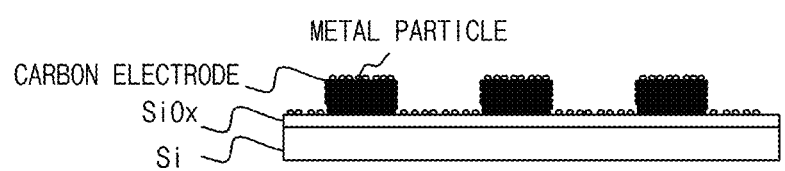

FIG. 2E illustrates the state where a metal film is applied to one surface of the carbon electrode, particularly, an upper end, of the carbon electrode. As another exemplary embodiment, FIG. 2F illustrates the state where metal particles are applied to one surface of the carbon electrode, particularly, an upper end, of the carbon electrode.

The metal film or the metal particles applied to the upper end of the carbon electrode may include one or more selected from the group consisting of Mg, Al, K, Ca, Sc, Ti, V, Cr, Mn, Fe, Co, Ni, Cu, Zn, Ga, Rb, Sr, Y, Zr, Mo, Ru, Rh, Pd, Ag, Cd, In, Sn, Cs, Ba, La, Ce, Nd, Sm, Eu, Gd, Tb, Hf, Ir, Pt, Tl, Pb, and Bi. Particularly, the metal may gold (Au). Otherwise, an oxide of the metal may be used.

Figure 2G:
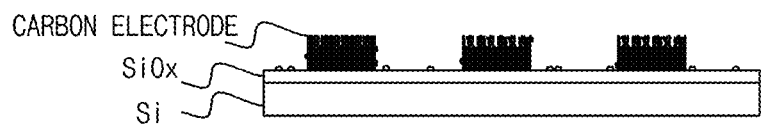

FIG. 2G illustrates the case where when the carbon electrode, to which the metal film or the metal particles are applied, is heat treated, the metal film or the metal particles are melted and penetrate into one surface, particularly, the upper end, of the carbon electrode, to generate a porous carbon electrode. In this case, a part of the carbon electrode, particularly, a surface portion of the upper end, of the carbon electrode, has a porous structure.

Figure 2H:
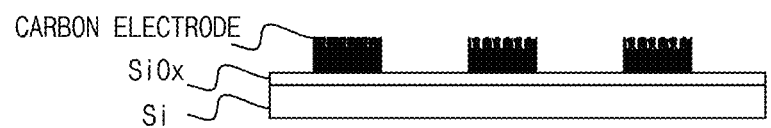

FIG. 2H illustrates the case where the metal film or the metal particles left on the carbon electrode are removed. It is preferable to use a carbon electrode formed of pure carbon by removing the metal film or the metal particles penetrating into the carbon electrode by using a gold etchant, after the heat treatment in FIG. 2G.

FIG. 3 is a diagram illustrating a method of manufacturing a porous carbon electrode according to still another exemplary embodiment of the present invention.

Figure 3A:
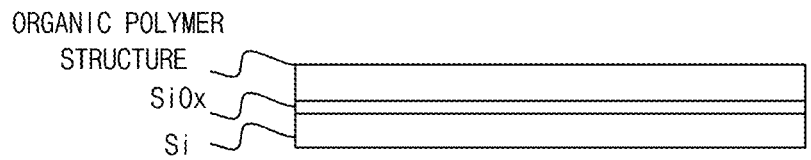
FIGS. 3A to 3G are diagrams illustrating a method of manufacturing a porous carbon electrode according to still another exemplary embodiment of the present invention.

Referring to FIG. 3, FIG. 3A illustrates the state where a silicon oxide (SiOx) film is formed on silicon (Si) and an organic polymer structure is formed on the silicon oxide (SiOx) film. In this case, the organic polymer structure may be a photosensitive material. Further, the organic polymer structure may include metal particles or impurities, not the pure organic polymer structure.

Figure 3B:
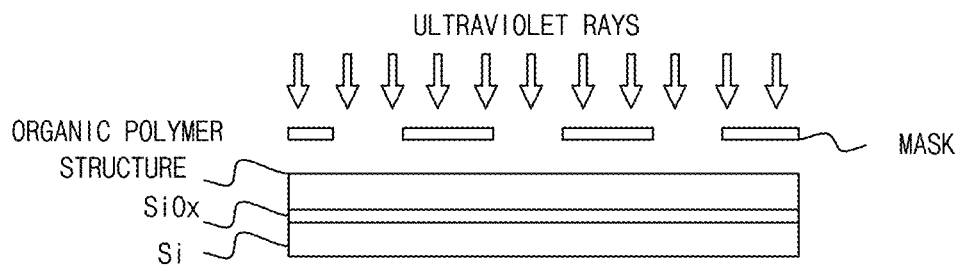

FIG. 3B illustrates the state where the organic polymer structure is etched through an optical etching process. That is, when a mask is put on the organic polymer structure and is irradiated with light, the organic polymer structure is etched according to a pattern of the mask. In this case, the irradiated light may be ultraviolet ray.

Figure 3C:
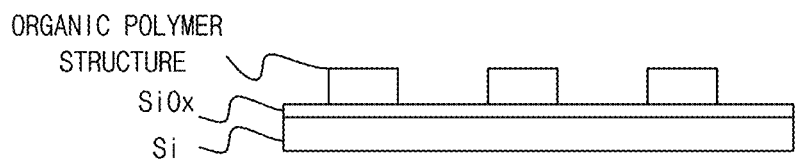

FIG. 3C illustrates the organic polymer structure in which the optical etching process is completed according to the pattern of the mask.

Figure 3D:
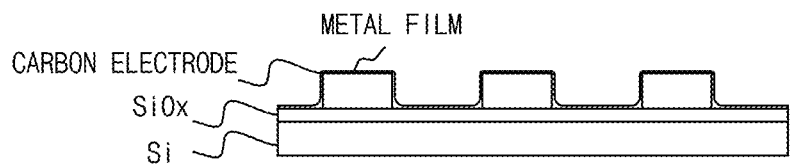
Figure 3E:
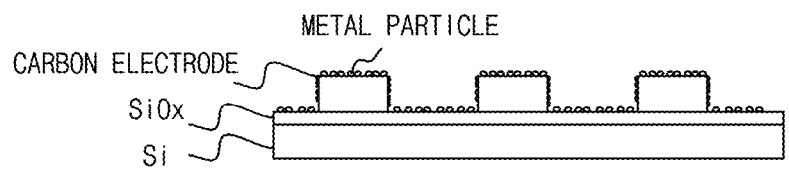

FIG. 3D illustrates the state where a metal film is applied to one surface of the carbon electrode, particularly, an upper end of the carbon electrode. As another exemplary embodiment, FIG. 3E illustrates the state where metal particles are applied to one surface of the carbon electrode, particularly, an upper end of the carbon electrode.

The metal film or the metal particles applied to the upper end of the carbon electrode may include one or more selected from the group consisting of Mg, Al, K, Ca, Sc, Ti, V, Cr, Mn, Fe, Co, Ni, Cu, Zn, Ga, Rb, Sr, Y, Zr, Mo, Ru, Rh, Pd, Ag, Cd, In, Sn, Cs, Ba, La, Ce, Nd, Sm, Eu, Gd, Tb, Hf, Ir, Pt, Tl, Pb, and Bi. Particularly, the metal may gold (Au). Otherwise, an oxide of the metal may be used.

Figure 3F:
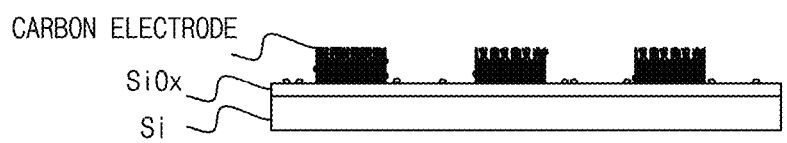

FIG. 3F illustrates the case where when the carbon electrode, to which the metal film or the metal particles are applied, is heat treated, the metal film or the metal particles are melted and penetrate into one surface, particularly, the upper end, of the carbon electrode, to generate a porous carbon electrode. In this case, a part, particularly, a surface portion of the upper end, of the carbon electrode, has a porous structure.

Figure 3G:
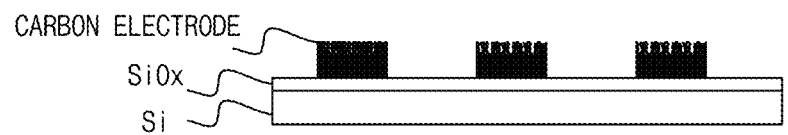

FIG. 3G illustrates the case where the metal film or the metal particles left on the carbon electrode are removed. It is preferable to use a carbon electrode formed of pure carbon by removing the metal film or the metal particles penetrating into the carbon electrode by using a gold etchant, after the heat treatment in FIG. 3F.

FIG. 4 is a diagram illustrating a method of manufacturing a porous carbon electrode obtained by patterning metal particles on one surface of a carbon electrode, followed by a heat treatment.

Figure 4A:
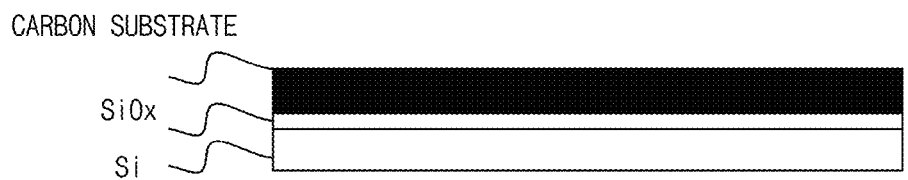
FIGS. 4A to 4C are diagrams illustrating a method of manufacturing a porous carbon electrode obtained by patterning metal particles on one surface of a carbon substrate, followed by a heat treatment.

FIG. 4A illustrates the state where a silicon oxide (SiOx) film is formed on silicon (Si) and a carbon electrode is formed on the silicon oxide (SiOx) film. In this case, the carbon electrode may be in a state of a flat substrate which is not patterned.

Figure 4B:
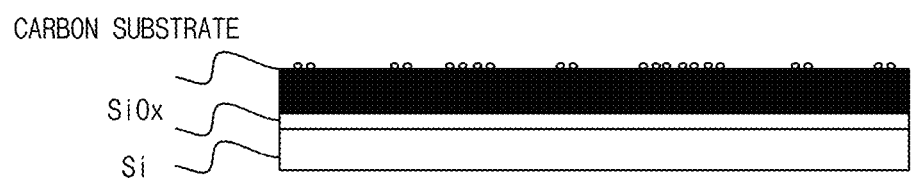

In FIG. 4B, a metal film or metal particles may be patterned and applied to an upper end of the carbon electrode.

Figure 4C:
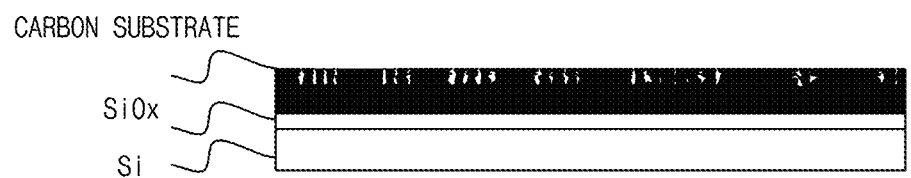

FIG. 4C illustrates the case where when the carbon electrode, to which the metal film or the metal particles are applied, is heat treated, the metal film or the metal particles are melted and penetrate into one surface, particularly, the upper end, of the carbon electrode according to the pattern of FIG. 4B, to generate a patterned porous carbon electrode. In this case, a part, particularly, a surface portion of the upper end, of the carbon electrode, has a porous structure.

FIG. 5 is a picture of a Scanning Electron Microscope (SEM) of a carbon electrode obtained by pyrolyzing an organic polymer structure.

Figure 5A:
FIGS. 5A to 5B are pictures of a Scanning Electron Microscope (SEM) of a carbon electrode obtained by pyrolyzing an organic polymer structure.
Figure 5B:
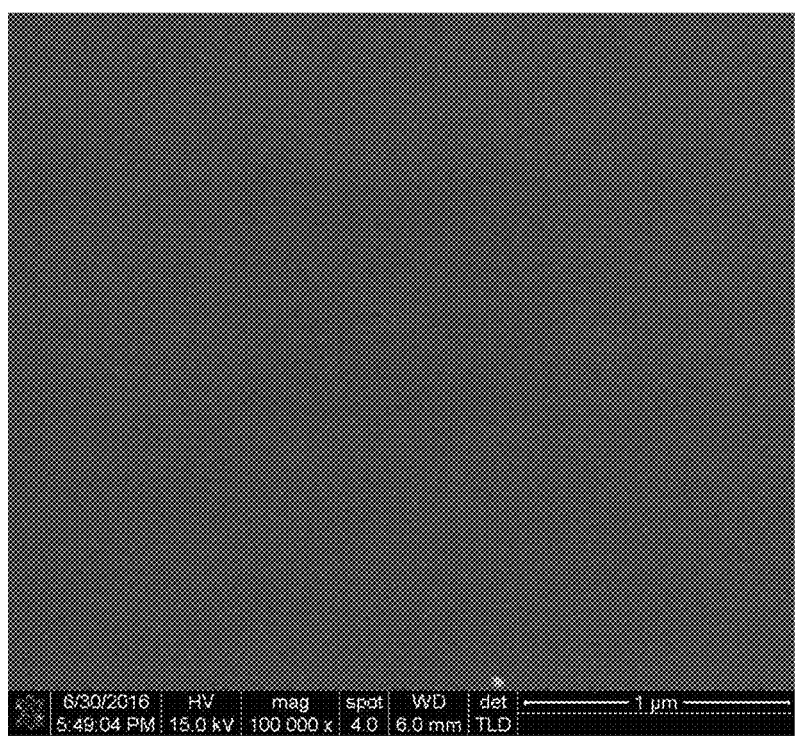

Referring to FIG. 5, FIG. 5A illustrates the case where the carbon electrode is observed at a scale of 2 µm, and FIG. 5B illustrates the case where the carbon electrode is enlarged and observed at a scale of 1 µm, and in both two cases, it can be seen that no structure can be observed in the carbon electrode.

Figure 6:
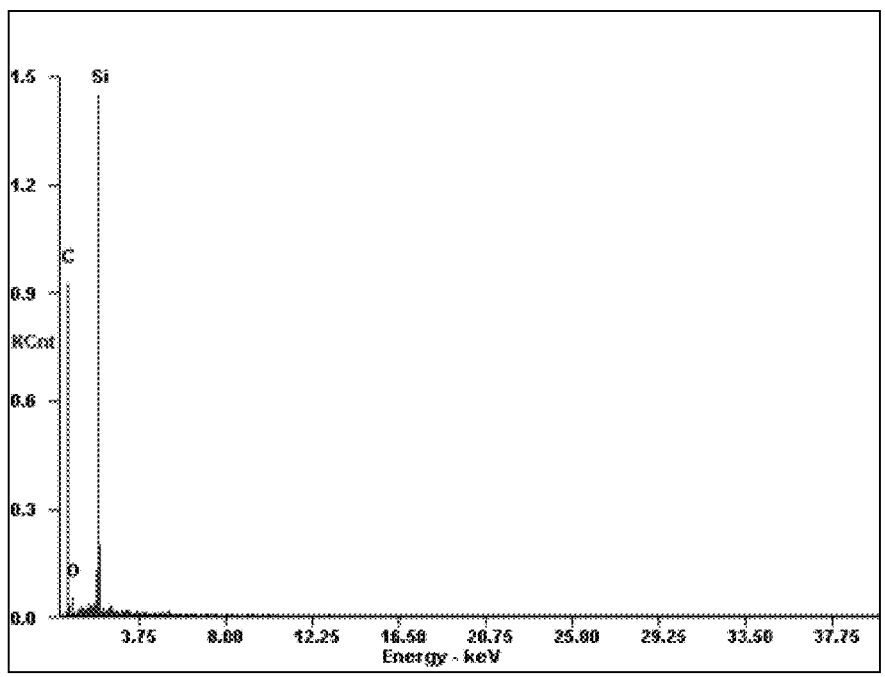
FIG. 6 is a diagram illustrating EDX data of a carbon electrode obtained by pyrolyzing an organic polymer structure.
Figure 6:
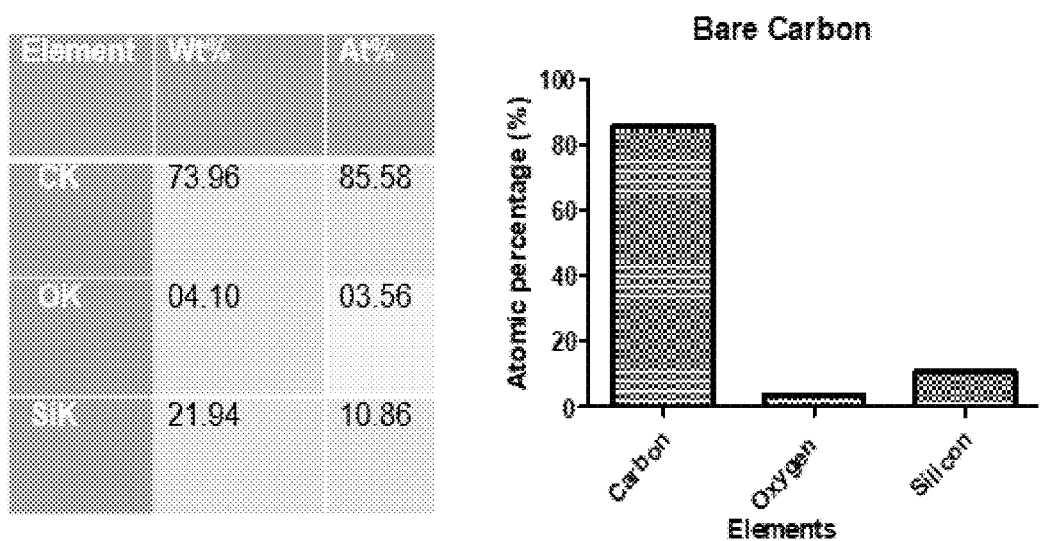

FIG. 6 is a diagram illustrating EDX data of a carbon electrode obtained by pyrolyzing an organic polymer structure.

Energy Dispersive X-ray Spectroscopy (EDX) is equipment additionally equipped to SEM equipment, and collects a specific X ray of a sample generated due to an electron beam of the SEM and analyzing a component of the sample.

Referring to FIG. 6, as a result of the analysis of surface components of a general carbon electrode by using the EDX, carbon (C) was detected by 73.96 wt %, oxygen was detected by 4.10 wt %, and silicon (Si) was detected by 21.94 wt %, and silicon was detected from a silicon substrate. It can be seen that other components of the organic polymer structure are almost removed during the pyrolysis process, and carbon and oxygen mainly remain.

FIG. 7 is a picture of an SEM of a gold thin film of a thickness of 10 nm, which is deposited on a carbon electrode, followed by a heat treatment at 600° C. for one hour according to an exemplary embodiment of the present invention.

Figure 7A:
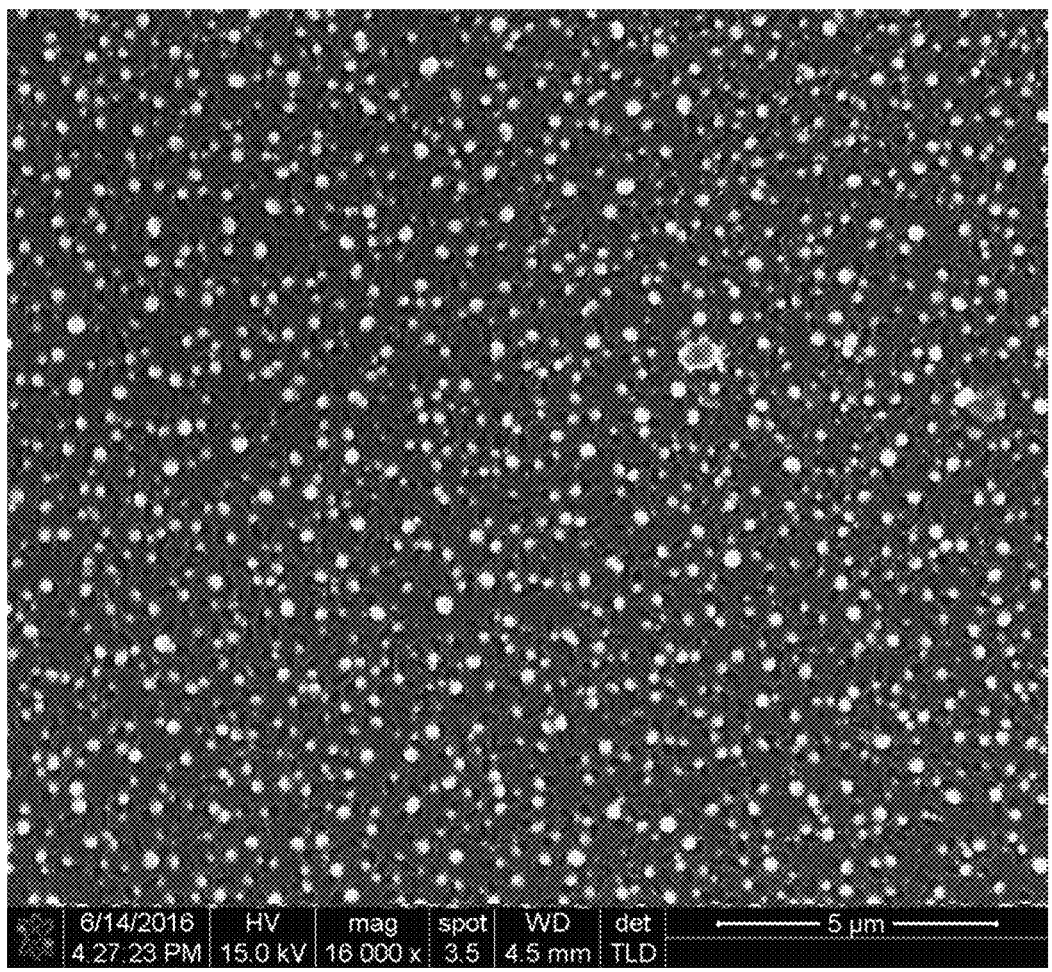
FIGS. 7A to 7C are pictures of an SEM of a gold thin film of a thickness of 10 nm, which is deposited on a carbon electrode, followed by a heat treatment at 600° C. for one hour according to an exemplary embodiment of the present invention.
Figure 7B:
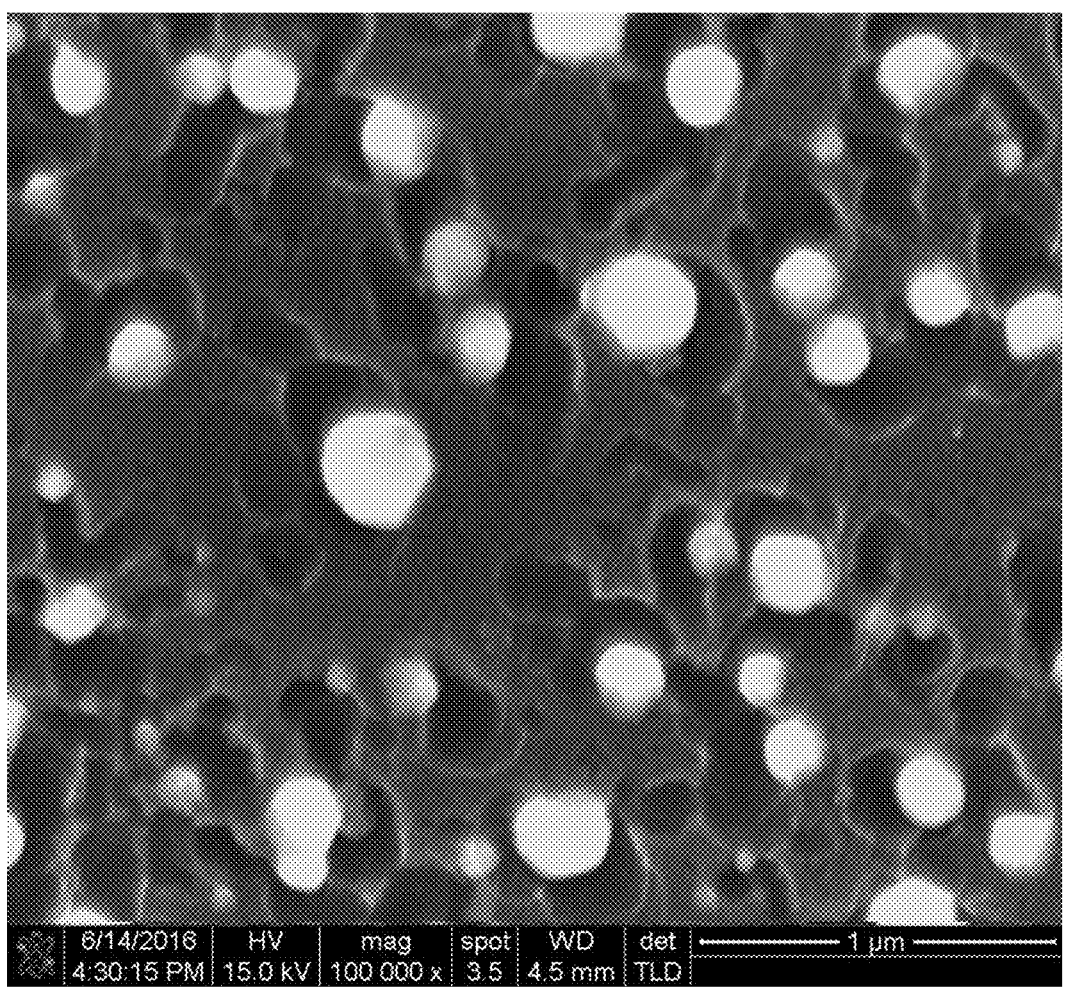
Figure 7C:
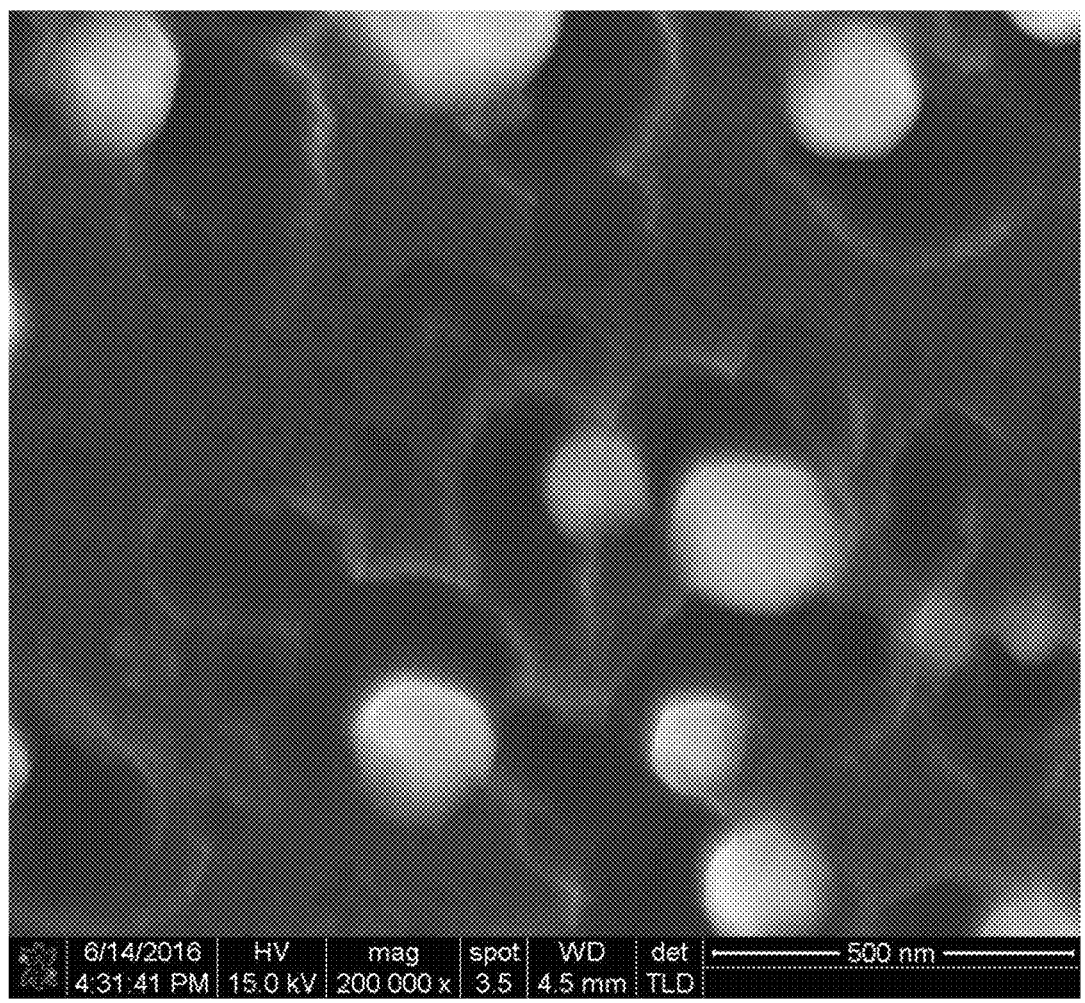

FIG. 7A illustrates the case where the carbon electrode is observed at a scale of 5 µm, FIG. 7B illustrates the case where the carbon electrode is enlarged and observed at a scale of 1 µm, and FIG. 7C illustrates the case where the carbon electrode is observed at a scale of 500 nm.

As can be observed in FIG. 7, a surface (a black portion) of the carbon electrode is etched and gold particles (white portions) are included in the carbon electrode.

After a gold thin film is deposited on the carbon electrode (by using evaporation), the gold thin film starts to be changed to the particle form at a temperature of 120 to 200° C., and then the surface of the carbon electrode that is in contact with each gold particle starts to be etched. A roughness structure formed on the surface of the carbon electrode is changed by at least one of a size of the gold particle and a distribution of the gold particles, and the size of the gold particle and the distribution of the gold particles are changed according to at least one of the conditions including an initial thickness of the gold thin film, a temperature, and a heat treatment time.

Figure 8:
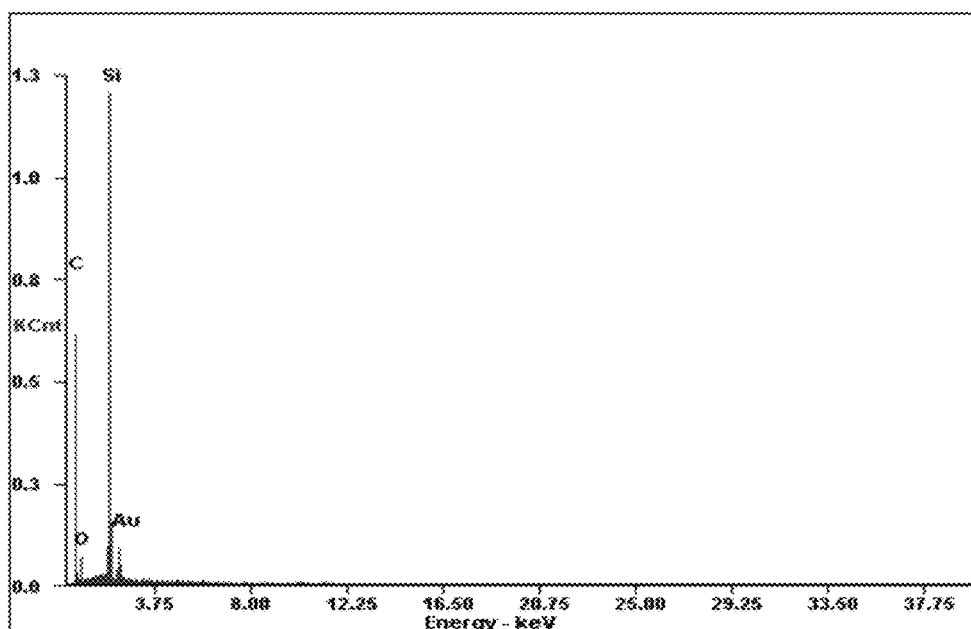
FIG. 8 is a diagram illustrating EDX data of the carbon electrode obtained by depositing the gold thin film on the carbon electrode, followed by the heat treatment in FIG. 7.
Figure 8:
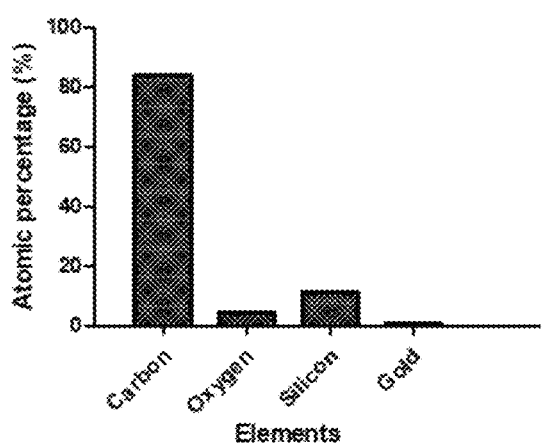

FIG. 8 is a diagram illustrating EDX data of the carbon electrode obtained by depositing the gold thin film on the carbon electrode, followed by the heat treatment in FIG. 7.

Referring to FIG. 8, as a result of the analysis of surface components of a general carbon electrode by using the EDX, carbon (C) was detected by 67.83 wt %, oxygen was detected by 4.41 wt %, silicon (Si) was detected by 21.18 wt %, and gold (Au) was detected by 6.58 wt %. As the result of the analysis of the component by using the EDX, gold was detected at a location at which the gold particle is located, and other impurities were not detected.

Figure 9:
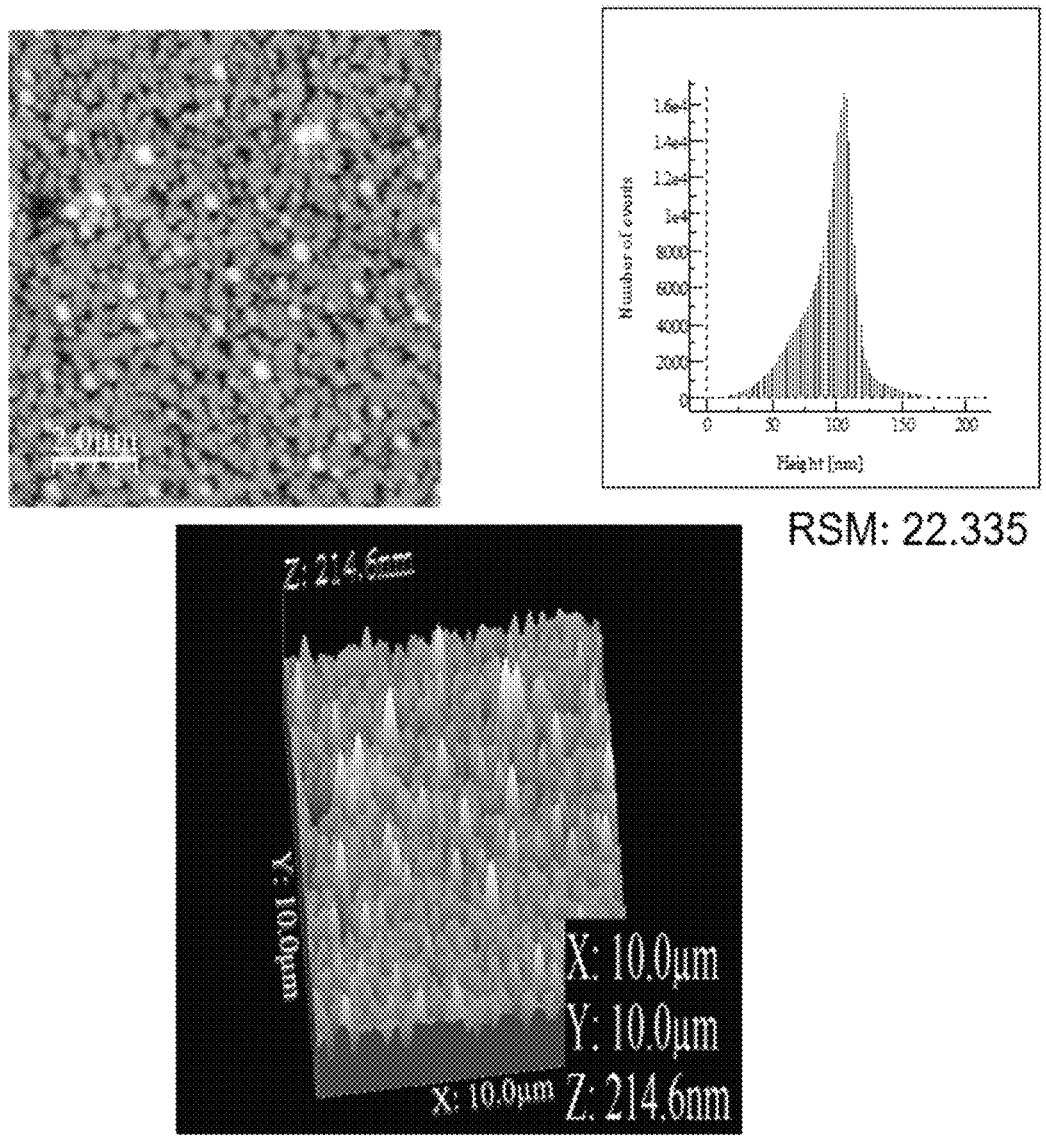
FIG. 9 is a diagram illustrating Atomic Force Microscopy (AFM) data of the carbon electrode obtained by depositing the gold thin film on the carbon electrode, followed by the heat treatment in FIG. 7.

FIG. 9 is a diagram illustrating Atomic Force Microscopy (AFM) data of the carbon electrode obtained by depositing the gold thin film on the carbon electrode, followed by the heat treatment in FIG. 7.

As a result of the investigation of surface roughness by using the AFM, when an area of 10 μm×10 μm was investigated, a height distribution of a nano structure is shown in the graph on the right of FIG. 9.

It can be seen that the height of 100 nm is the most, and the distribution is mostly between heights of 50 and 150 nm. RSM (roughness profile) is an average value of a period of each bend, and was measured by about 22.335.

FIG. 10 is a picture of an SEM of a gold thin film of a thickness of 10 nm, which is deposited on a carbon electrode, followed by a heat treatment at 900° C. for one hour according to an exemplary embodiment of the present invention.

Figure 10A:
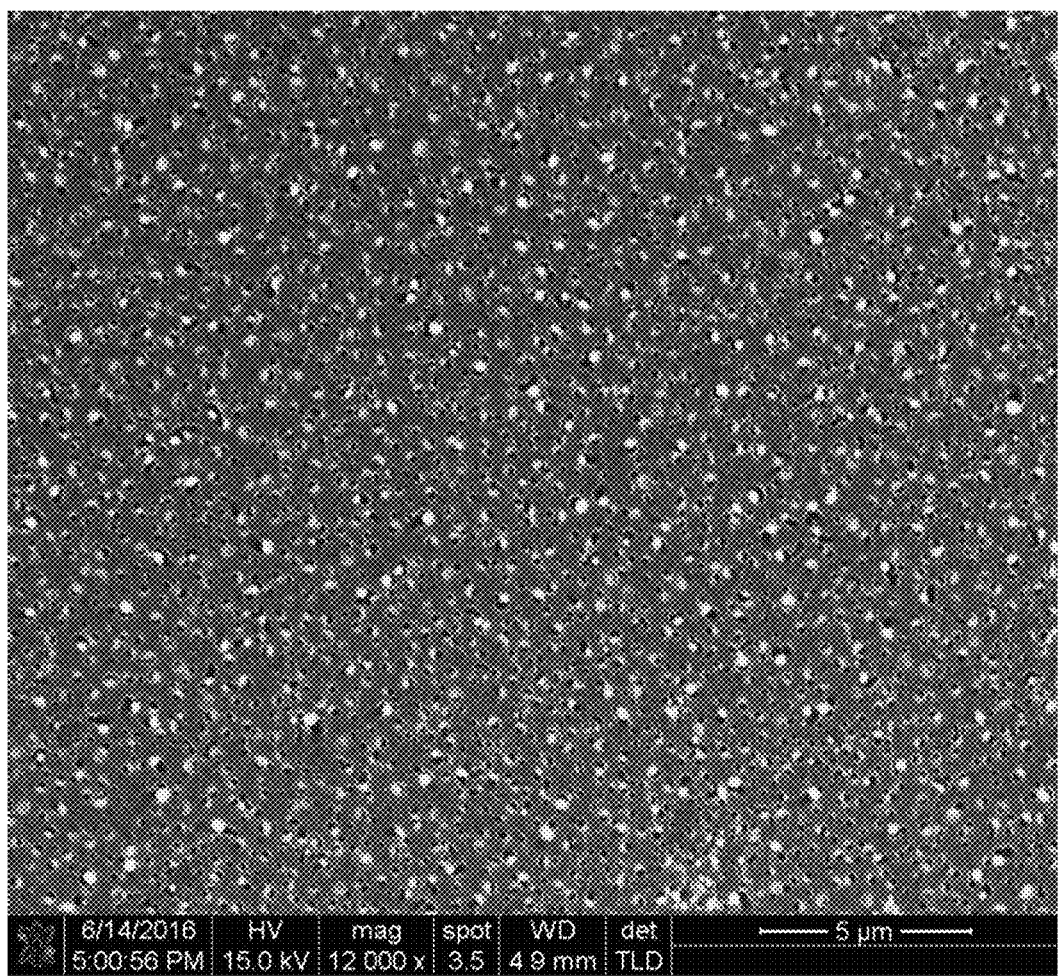
FIGS. 10A to 10C are pictures of an SEM of a gold thin film of a thickness of 10 nm, which is deposited on a carbon electrode, followed by a heat treatment at 900° C. for one hour according to an exemplary embodiment of the present invention.
Figure 10B:
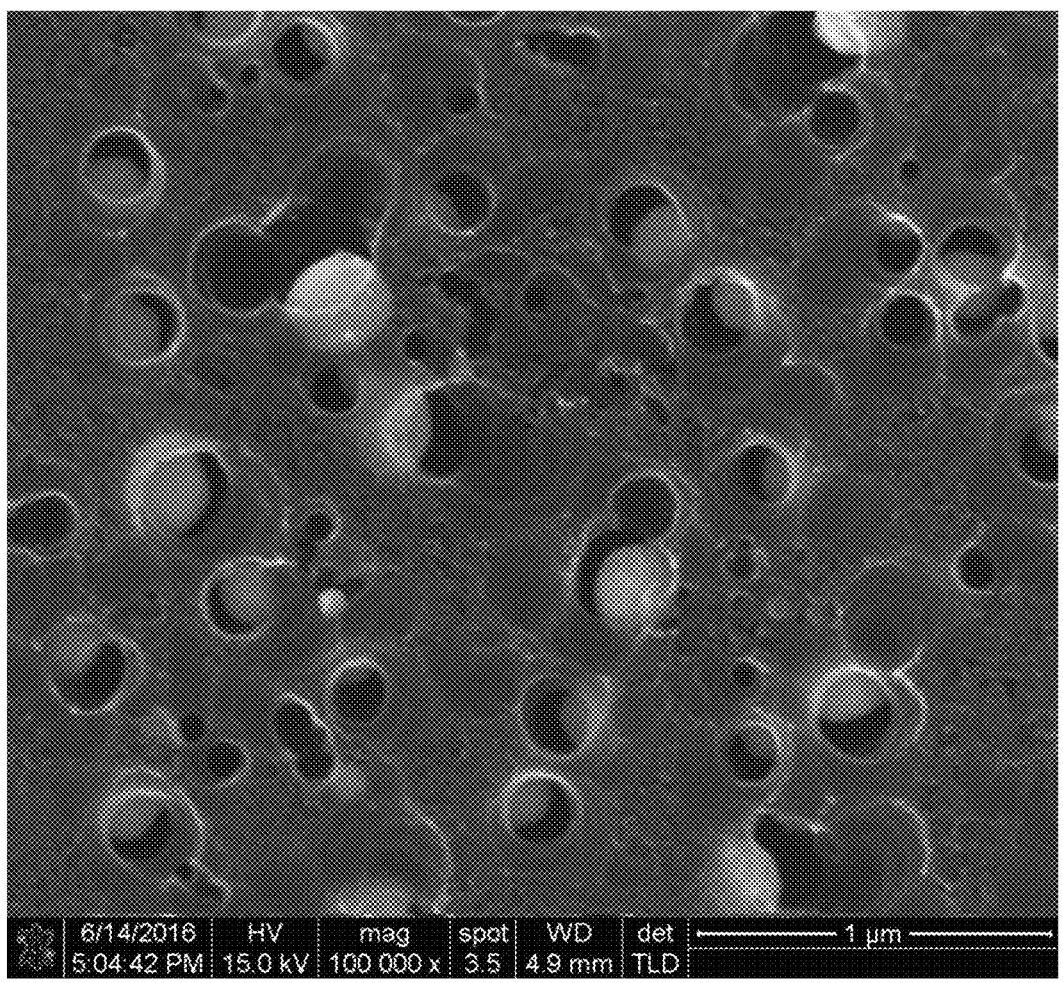
Figure 10C:
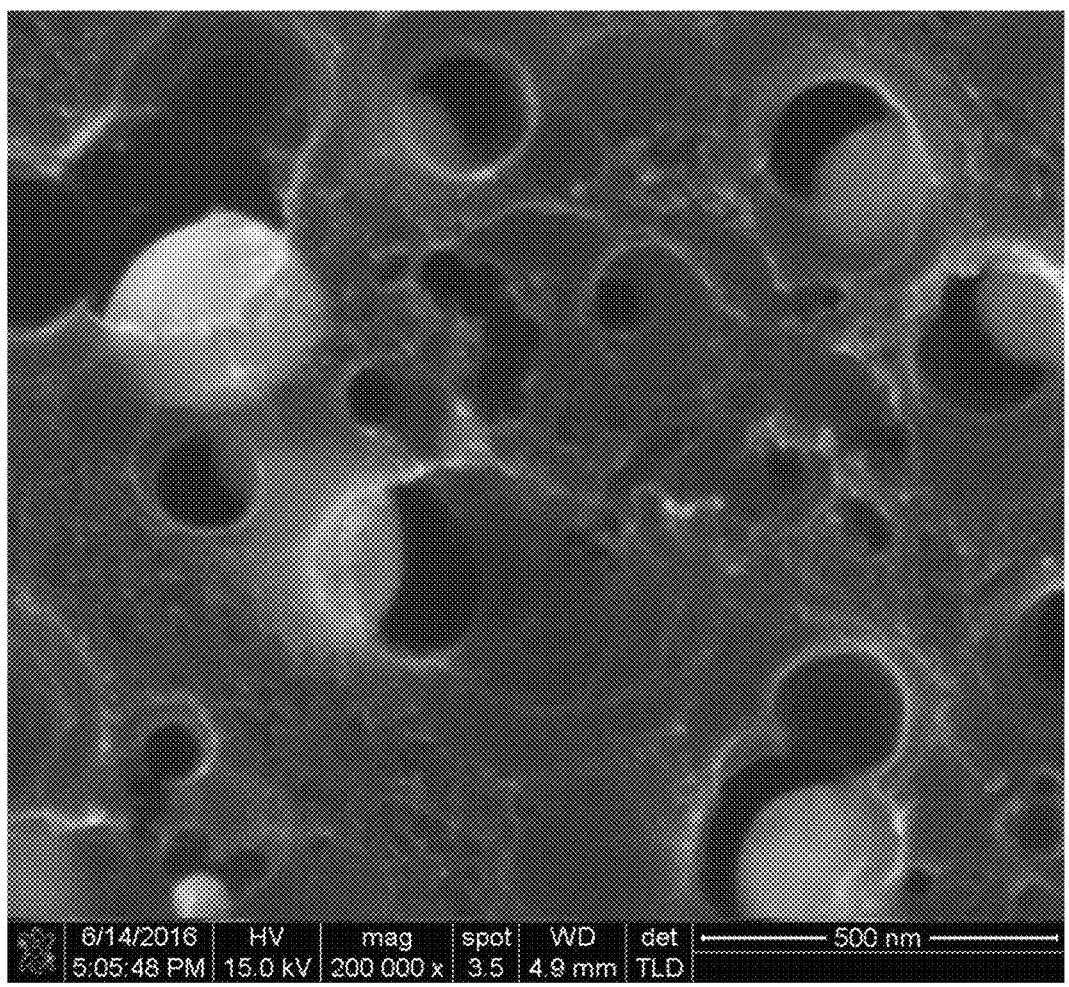

FIG. 10A illustrates the case where the carbon electrode is observed at a scale of 5 μm, FIG. 10B illustrates the case where the carbon electrode is enlarged and observed at a scale of 1 μm, and FIG. 10C illustrates the case where the carbon electrode is observed at a scale of 500 nm.

As can be observed in FIG. 10, a surface (a black portion) of the carbon electrode is etched and gold particles (white portions) are included in the carbon electrode.

After a gold thin film is deposited on the carbon electrode (by using evaporation), the gold thin film starts to be changed to the particle form at a temperature of 120 to 200° C., and then the surface of the carbon electrode that is in contact with each gold particle starts to be etched. A roughness structure formed on the surface of the carbon electrode is changed by at least one of a size of the gold particle and a distribution of the gold particles, and the size of the gold particle and the distribution of the gold particles are changed according to at least one of the conditions including an initial thickness of the gold thin film, a temperature, and a heat treatment time.

When the result of the heat treatment at 600° C. for one hour in FIG. 7 is compared with the result of the heat treatment at 900° C. for one hour in FIG. 10, it can be seen that the gold particles penetrate deeper from the surface of the carbon electrode at 900° C., resulting in higher porosity.

Figure 11:
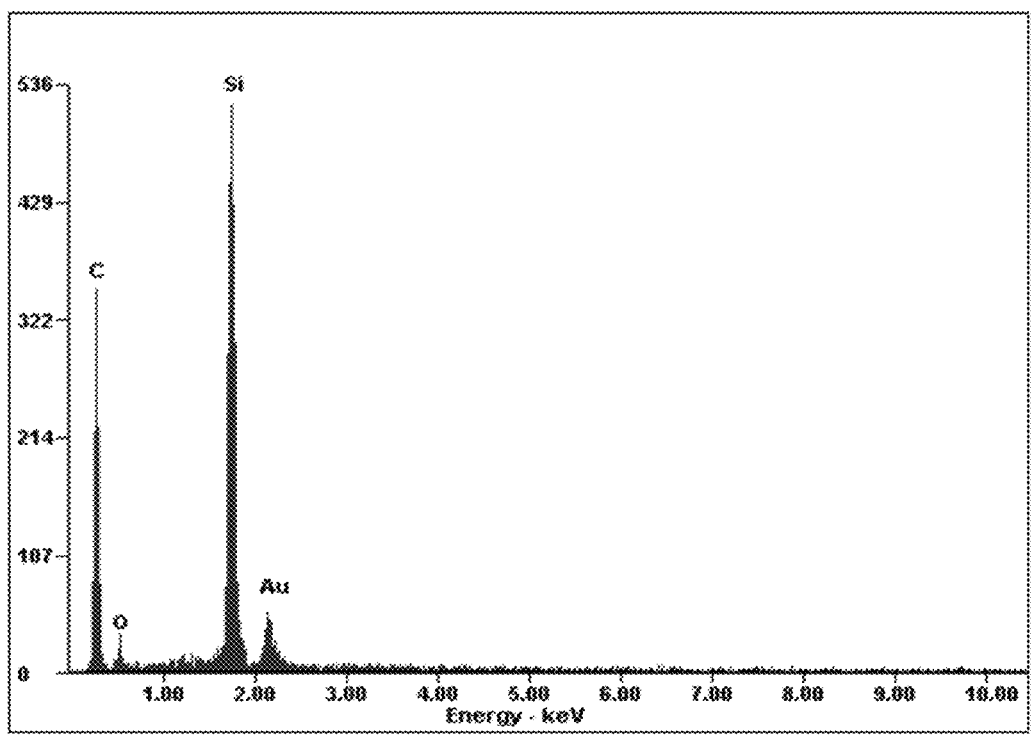
FIG. 11 is a diagram illustrating EDX data of the carbon electrode obtained by depositing the gold thin film on the carbon electrode, followed by the heat treatment in FIG. 10.
Figure 11:
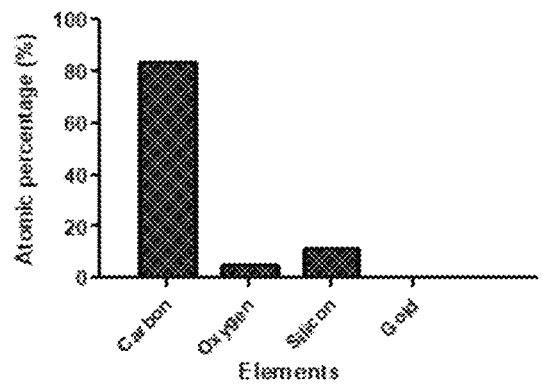

FIG. 11 is a diagram illustrating EDX data of the carbon electrode obtained by depositing the gold thin film on the carbon electrode, followed by the heat treatment in FIG. 10.

Referring to FIG. 11, as a result of the analysis of surface components of a general carbon electrode by using the EDX, carbon (C) was detected by 66.77 wt %, oxygen was detected by 5.10 wt %, silicon (Si) was detected by 21.10 wt %, and gold (Au) was detected by 7.03 wt %. As the result of the analysis of the component by using the EDX, gold was detected at a location at which the gold particle is located, and other impurities were not detected. Further, when the EDX data of FIG. 11 is compared with the EDX data of FIG. 8, it can be seen that weight % of carbon is decreased and weight % of gold is increased.

Figure 12:
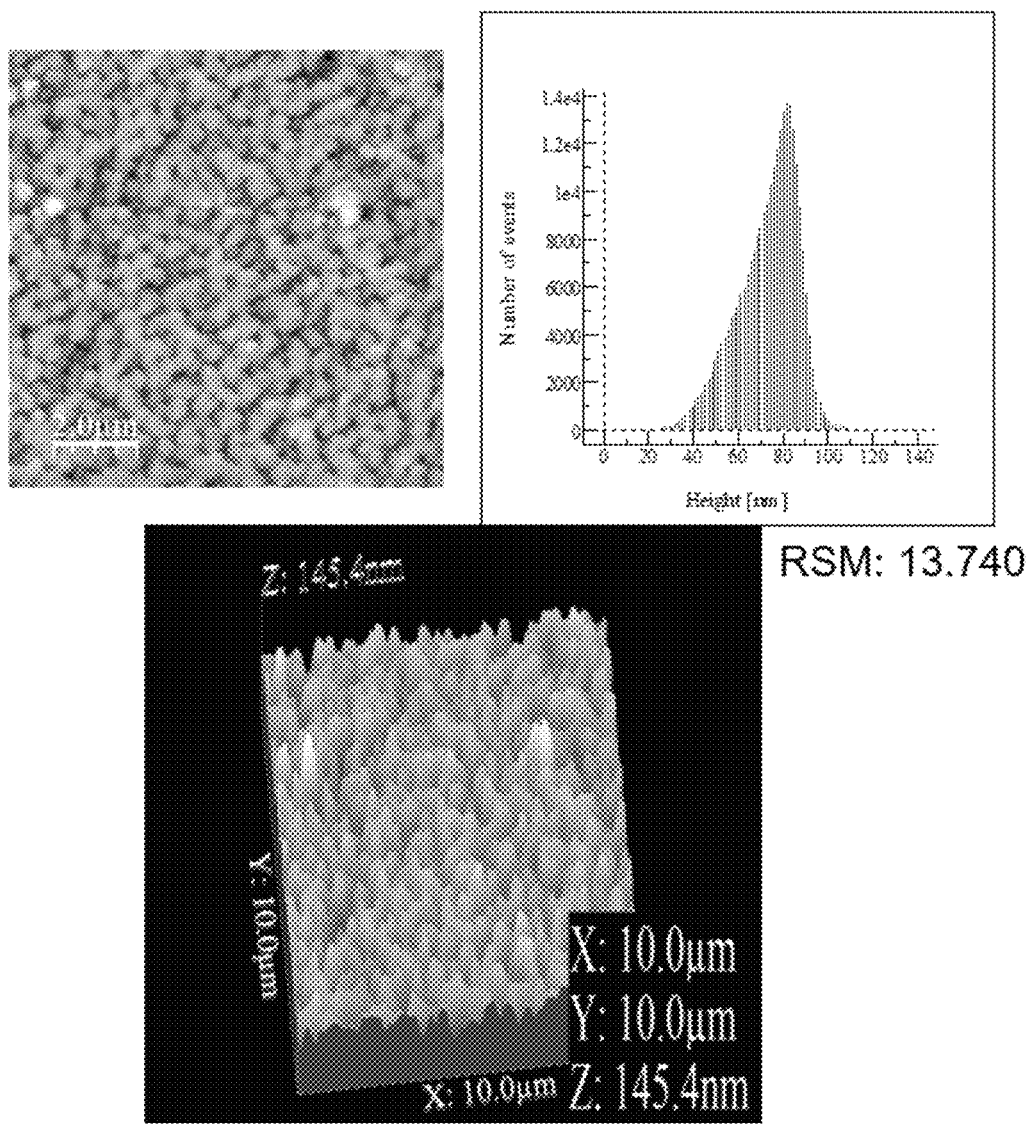
FIG. 12 is a diagram illustrating AFM data of the carbon electrode obtained by depositing the gold thin film on the carbon electrode, followed by the heat treatment in FIG. 10.

FIG. 12 is a diagram illustrating AFM data of the carbon electrode obtained by depositing the gold thin film on the carbon electrode, followed by the heat treatment in FIG. 10.

As a result of the investigation of surface roughness by using the AFM, when an area of 10 μm×10 μm was investigated, a height distribution of a nano structure is shown in the graph on the right of FIG. 12.

It can be seen that the height of 80 nm is the most, and the distribution is mostly between heights of 40 and 90 nm. RSM (roughness profile) is an average value of a period of each bend, and was measured by about 13 nm.

FIG. 13 is a diagram illustrating a comparison of battery performance between the case where a general carbon electrode is used in an ultracapacitor and the case where the porous carbon electrode according to an exemplary embodiment of the present invention is used in an ultracapacitor.

Figure 13A:
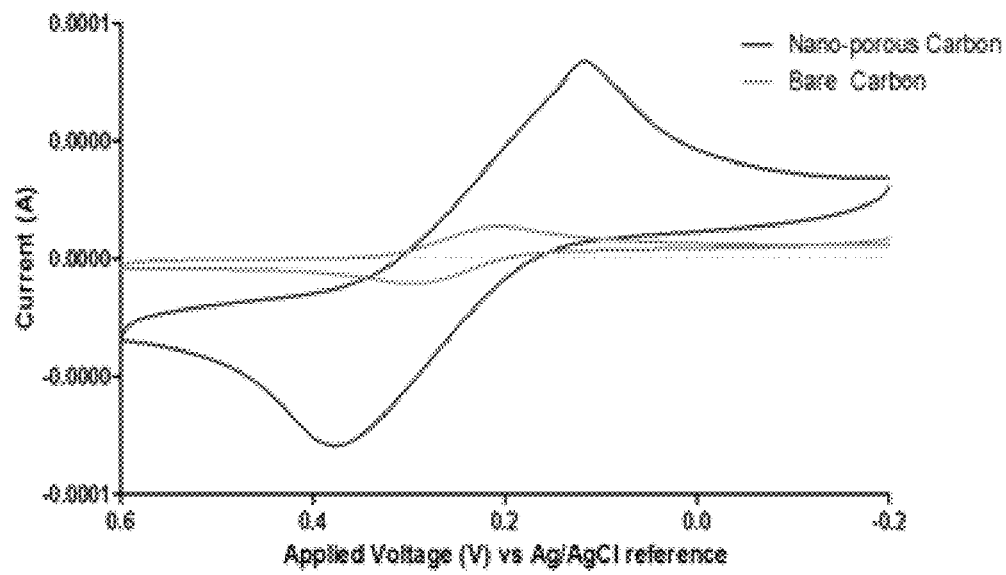
FIGS. 13A to 13B are diagrams illustrating a comparison of battery performance between the case where a general carbon electrode is used in an ultracapacitor and the case where the porous carbon electrode according to an exemplary embodiment of the present invention is used in an ultracapacitor.

FIG. 13A illustrates a size of current according to an applied voltage, and when the porous carbon electrode is used, more currents are generated compared to the case where the general carbon electrode is used.

Figure 13B:
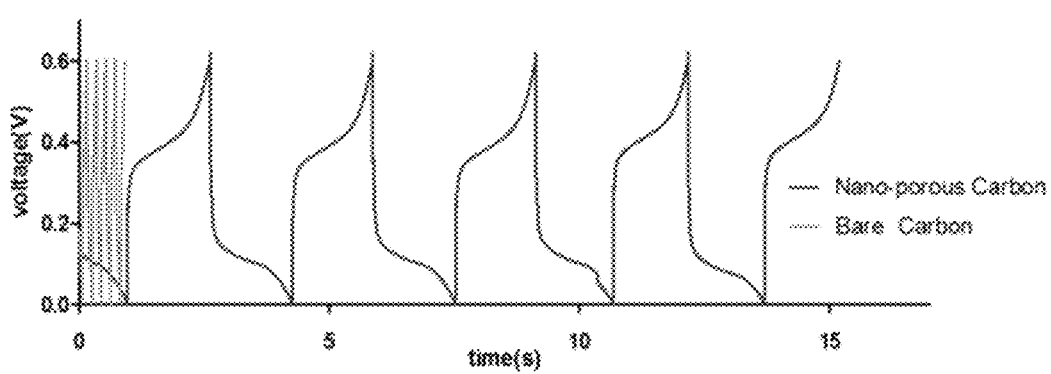

FIG. 13B illustrates a size of a voltage according to time, and when the general carbon electrode is used, the battery is discharged within a very short time, but when the porous carbon electrode is used, the battery maintains the voltage for a sufficiently long time. Accordingly, it can be seen that the porous carbon electrode exhibits more excellent battery performance than that of the general carbon electrode.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the invention.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The invention claimed is:

1. A method of manufacturing a porous carbon electrode, the method comprising:
   applying a metal film or metal particles to one surface of a carbon electrode;
   heat treating the carbon electrode to which the metal film or the metal particles is or are applied; and
   forming the one surface of the carbon electrode in a porous structure, wherein pores of the porous structure are generated by movements of the metal film or the metal particles, which is or are melted by heat and moved from an upper end of the carbon electrode into an inside of the carbon electrode, to penetrate into the one surface of the carbon electrode, and
   wherein when the metal film is or the metal particles are applied to the one surface of the carbon electrode, the metal film is or the metal particles are applied in patterned form.

2. The method of claim 1, further comprising:
removing the metal film or the metal particles from the carbon electrode formed in the porous structure.

3. The method of claim 1, further comprising:
forming the carbon electrode by pyrolyzing an organic polymer structure.

4. The method of claim 3, wherein the organic polymer structure is a photosensitive material.

5. The method of claim 3, wherein the organic polymer structure is patternable through an optical etching process.

6. The method of claim 3, wherein the organic polymer structure includes metal particles and impurities.

7. A method of manufacturing a porous carbon electrode, the method comprising:
applying a metal film or metal particles to one surface of a carbon electrode;
heat treating the carbon electrode to which the metal film or the metal particles is or are applied; and
forming the one surface of the carbon electrode in a porous structure, wherein pores of the porous structure are generated by movements of the metal film or the metal particles, which is or are melted by heat and moved from an upper end of the carbon electrode into an inside of the carbon electrode, to penetrate into the one surface of the carbon electrode, and
wherein the metal film or the metal particle comprises or comprise gold.

8. A method of manufacturing a porous carbon electrode, the method comprising:
applying a metal film or metal particles to one surface of an organic polymer structure;
heat treating the organic polymer structure to which the metal film or the metal particles is or are applied; and
forming the organic polymer structure in a form of a porous carbon electrode, wherein pores of the porous carbon electrode are generated by movements of the metal film or the metal particles, which is or are melted by heat and moved from an upper end of the organic polymer structure into an inside of the organic polymer structure, to penetrate into the one surface of the organic polymer structure, and
wherein when the metal film is or the metal particles are applied to the one surface of the organic polymer structure, the metal film is or the metal particles are applied in patterned form.

* * * * *